(12) United States Patent
Niederberger et al.

(10) Patent No.: US 9,671,296 B2
(45) Date of Patent: Jun. 6, 2017

(54) PORTABLE ELECTRONIC DEVICE WITH INTEGRATED TEMPERATURE SENSOR

(71) Applicant: Sensirion AG, Stafa (CH)

(72) Inventors: Dominik Niederberger, Zurich (CH); Andrea Sacchetti, Zurich (CH); Dominic Boni, Dielsdorf (CH); Andrea Wuest, Zurich (CH); Pascal Gerner, Zurich (CH); Markus Graf, Heinrichstrasse (CH); Martin Wirz, Zurich (CH)

(73) Assignee: Sensirion AG, Stafa (CH)

( * ) Notice: Subject to any disclaimer, the term of this patent is extended or adjusted under 35 U.S.C. 154(b) by 437 days.

(21) Appl. No.: 14/290,373

(22) Filed: May 29, 2014

(65) Prior Publication Data
US 2014/0355649 A1   Dec. 4, 2014

(30) Foreign Application Priority Data

May 31, 2013  (EP) .................................. 13002823
Sep. 10, 2013  (CH) .................................. 1565/13

(51) Int. Cl.
*G01K 7/42* (2006.01)
*G01D 3/036* (2006.01)
*G01K 1/20* (2006.01)
*H04M 1/725* (2006.01)

(52) U.S. Cl.
CPC ............. *G01K 7/42* (2013.01); *G01D 3/0365* (2013.01); *G01K 1/20* (2013.01); *H04M 1/72569* (2013.01)

(58) Field of Classification Search
CPC ................................ G01K 1/20; G01K 7/427
See application file for complete search history.

(56) References Cited

U.S. PATENT DOCUMENTS

| | | |
|---|---|---|
| 3,817,453 A | 6/1974 | Pinckaers |
| 4,096,575 A | 6/1978 | Itoh |
| 5,199,637 A | 4/1993 | Adams |
| 5,502,838 A | 3/1996 | Kikinis |
| 5,721,837 A | 2/1998 | Kikinis et al. |

(Continued)

FOREIGN PATENT DOCUMENTS

| | | |
|---|---|---|
| DE | 10150823 | 10/2000 |
| EP | 0387025 | 9/1990 |

(Continued)

OTHER PUBLICATIONS

M. Afridi et al. "MEMS-based Embedded Sensor Virtual Components for System-on-a-Chip (SoC)" Elsevier, Solid State Electronics, vol. 48, 2004, pp. 1777-1781.

(Continued)

*Primary Examiner* — Minh Phan
*Assistant Examiner* — Leon W Rhodes, Jr.
(74) *Attorney, Agent, or Firm* — Cooper & Dunham LLP (57) ABSTRACT

There is provided a portable electronic device with one or more integrated temperature sensors (12) for measuring an ambient temperature, a compensator (25,26) for reducing the difference between a sensor output (Ts) and the ambient temperature (Ta) with the compensator (25,26) switching depending on environmental and/or handling conditions between a plurality of compensation modes selected dependent on measurements of one or more other integrated and/or external sensors.

8 Claims, 5 Drawing Sheets

(56) References Cited

U.S. PATENT DOCUMENTS

| | | | |
|---|---|---|---|
| 6,203,191 B1 | 3/2001 | Mongan | |
| 6,728,552 B2 | 4/2004 | Chatain | |
| 6,912,386 B1 | 6/2005 | Himberg et al. | |
| 7,027,834 B2 | 4/2006 | Soini et al. | |
| 7,280,301 B1 | 10/2007 | Jackson et al. | |
| 7,364,353 B2 | 4/2008 | Kolk | |
| 8,649,997 B2 * | 2/2014 | Farrell | A61B 5/14532 340/573.1 |
| 8,801,275 B2 * | 8/2014 | Wu | G01K 1/20 374/10 |
| 9,417,665 B2 * | 8/2016 | Boettcher | G06F 1/1684 |
| 2003/0064749 A1 | 4/2003 | Soini et al. | |
| 2007/0100666 A1 * | 5/2007 | Stivoric | G01R 29/0814 705/3 |
| 2008/0143522 A1 | 6/2008 | Sung | |
| 2008/0165116 A1 | 7/2008 | Herz et al. | |
| 2009/0140059 A1 | 6/2009 | Barton et al. | |
| 2009/0144014 A1 | 6/2009 | Aljabari | |
| 2010/0163713 A1 | 7/2010 | Cheng et al. | |
| 2010/0268475 A1 | 10/2010 | Kusumoto | |
| 2010/0307916 A1 | 12/2010 | Ramey et al. | |
| 2011/0059775 A1 | 3/2011 | Choi et al. | |
| 2011/0119018 A1 | 5/2011 | Skarp | |
| 2011/0127026 A1 | 6/2011 | Schuch et al. | |
| 2011/0216806 A1 | 9/2011 | Weng | |
| 2011/0307208 A1 | 12/2011 | Graf et al. | |
| 2012/0253691 A1 | 10/2012 | Graf et al. | |
| 2013/0217979 A1 * | 8/2013 | Blackadar | A61B 5/0024 600/301 |
| 2014/0278192 A1 * | 9/2014 | Ochi | G01N 27/3274 702/104 |
| 2014/0311209 A1 | 10/2014 | Niederberger et al. | |
| 2014/0321503 A1 | 10/2014 | Niederberger et al. | |
| 2015/0073741 A1 | 3/2015 | Wuest et al. | |

FOREIGN PATENT DOCUMENTS

| | | |
|---|---|---|
| EP | 1301014 | 4/2003 |
| EP | 1469323 | 10/2004 |
| EP | 1873506 | 1/2008 |
| EP | 1947432 | 7/2008 |
| EP | 2392898 | 12/2011 |
| EP | 2682715 | 1/2014 |
| EP | 2793450 | 10/2014 |
| EP | 2796841 | 10/2014 |
| EP | 2797000 | 10/2014 |
| EP | 2808650 | 12/2014 |
| EP | 2808651 | 12/2014 |
| EP | 2808652 | 12/2014 |
| GB | 2190203 | 11/1987 |
| JP | 2006105870 | 4/2006 |
| JP | 2010101741 | 5/2010 |
| WO | 01/69341 | 9/2001 |
| WO | 2010040090 | 4/2010 |
| WO | 2010139473 | 12/2010 |
| WO | 2011139456 | 11/2011 |
| WO | 2012027754 | 3/2012 |
| WO | 2013045897 | 4/2013 |
| WO | 2014005234 | 1/2014 |
| WO | 2014005235 | 1/2014 |
| WO | 2014067022 | 5/2014 |

OTHER PUBLICATIONS

Sensirion, "Humidity at a Glance" Most Relevant Equations with Sample Code, Version 1.0, Aug. 2008, pp. 1-2.

Sensirion, "Introduction to Humidity" Basic Principles on Physics of Water Vapor, Version 2.0, Aug. 2009, pp. 1-6.

Sensirion, "Data Sheet SHTC1", Humidity and Temperature Sensor IC, Version 3, May 2014, pp. 1-14.

Sensirion, "Datasheet STS21" Temperature Sensor IC, Version 2, Dec. 2011, pp. 1-12.

Steven W. Smith, The Scientists and Engineer's Guide to Digital Signal Processing, "Statistics, Probability and Noise", Chapter 2, pp. 11-34, Apr. 27, 2006.

Ip.com, Portable Electronic Device, An IP.com Prior Art Database Technical Disclosure, Jun. 24, 2013, XP013157887, 19 Pages.

Search Report for European Appln. No. 13002823.6, dated Oct. 30, 2015.

Search Report for European Appln. No. 14001758.3, dated Oct. 14, 2015.

Search Report for Switzerland Appln. No. CH01565/13, dated Dec. 9, 2013.

Mayank Goel, et al. "GripSense: Using Built-In Sensors to Detect Hand Posture and Pressure on Commodity Mobile Phones" by UIST, Oct. 7-10, 2012, Cambridge, Massachusetts, USA, pp. 542-554.

* cited by examiner

PORTABLE ELECTRONIC DEVICE WITH INTEGRATED TEMPERATURE SENSOR

TECHNICAL FIELD

The present invention relates to a portable electronic device including an integrated temperature sensor and a method for measuring the temperature using such a device.

BACKGROUND OF THE INVENTION

It is known for example from the co-owned published United States patent application no. 2011/0307208 A1 that sensors respond to a sudden change with a change determined not only by the change itself but also by their own response function. The '208 application describes a dynamic compensation of this behaviour of the sensor in order to generate results of the measurements in shorter time than would be possible by simply waiting until the sensor reaches a new steady state.

It is also important for temperature sensors to compensate for offsets caused by internal heat sources of the device. Such offsets can be compensated for by modelling the heat sources, heat flows and heat capacities of the device depending on the actual state of the device using measurements of the heat generated by the sources.

In spite of such compensation further errors of temperature measurements as performed by a temperature sensor integrated into a portable device can be caused by changes in the environment or handling of the device.

Therefore it is seen as an object of the invention to further improve the compensation for such errors and hence the accuracy of a temperature sensor in portable electronic device.

SUMMARY OF THE INVENTION

In accordance with an aspect of the invention there is provided a portable electronic device with one or more integrated temperature sensors for measuring an ambient temperature, a compensator for reducing the difference between the temperature sensor output and the actual ambient temperature, wherein the compensator changes its mode depending on a change in the environment and/or handling of the device as measured by other integrated sensors.

The compensator can include a heat compensator used to apply a correction based on a model of the heat flow between the sensor and internal active components generating heat when in use. The compensator can include a dynamic compensator used to apply a correction based on a model of the response of the sensor during a temperature change in order to accelerate the read-out during a temperature change.

The changes in the environment and/or handling are generally caused by a corresponding change in the external or environmental conditions under which the device is operated. Such changes can include for example the changes caused by intermittently storing the device in a pocket, or exposure of the device to sun light, wind or other external heat sources or mechanisms of cooling. Alternatively or in addition the change can be caused by the way the device is held by a user.

The change is detected by at least one further sensor integrated into the device. Such sensors can include for example a brightness, RGB or IR sensor to detect sun light exposure or a microphone to detect the presence of wind and/or its strength. Sensors to detect the handling can include a touch sensitive surface or screen, or orientation or motion sensors. However, the change in environmental conditions can in principle also be detected by sensors external to the device and communicated to the device, such as prevalent wind strength and directions, cloud coverage and the like.

The changes as detected are best processed in a model to select between different scenarios. The different scenarios are preferably reflected in different modes or models as used in the compensator.

The portable electronic device can preferably be a mobile phone, a handheld computer, an electronic reader, a tablet computer, a game controller, a pointing device, a photo or a video camera, a digital music player, a wrist watch, a key fob, a head set, a digital photo frame and a computer peripheral.

The above aspects can also be applied to other environmental sensors such as humidity or gas sensors, where such sensors use a compensator to reduce the effects of sensor response function or rapid environmental changes (indoor/outdoor). Other advantageous embodiments are listed in the dependent claims as well as in the description below. The described embodiments similarly pertain to the device, the method, and any computer program elements. Synergetic effects may arise from different combinations of the embodiments although they might not be described in detail.

Further all embodiments of the present invention concerning a method might be carried out in the order of the steps as described. Nevertheless this has not to be the only essential order of steps but all different orders of the method steps where technically feasible shall be comprised in the scope of the claims and be disclosed by the method claims.

BRIEF DESCRIPTION OF THE DRAWINGS

The detailed description refers to examples of the present invention making reference to the annexed drawings, wherein.

DETAILED DESCRIPTION

Figure 1A:
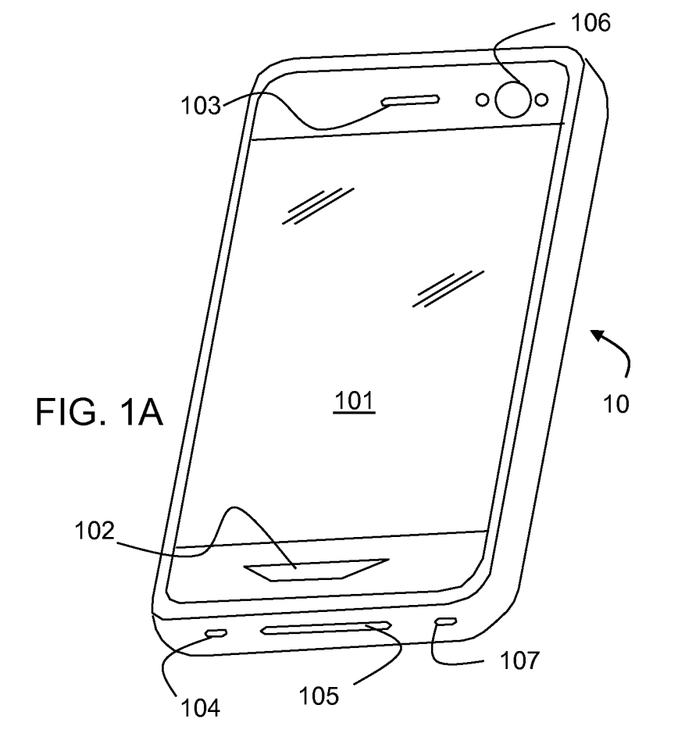
FIG. 1A is a perspective view of a portable electronic device.

The device of FIG. 1A is a portable electronic device such as a mobile phone. The housing 10 of the mobile phone includes a front side with a screen 101 and elements like buttons 102 to let a user interact with the phone. Also shown on the front side is an opening 103 for a loudspeaker. Further openings 104,105 are located at a lower side wall of the housing 10. It is well known to mount components like microphones and loudspeakers behind such openings. The phone includes one or two cameras 106, and internally additional sensors (not shown) such as location sensors or GPS, and acceleration and orientation sensors in a manner well known.

Figure 1B:
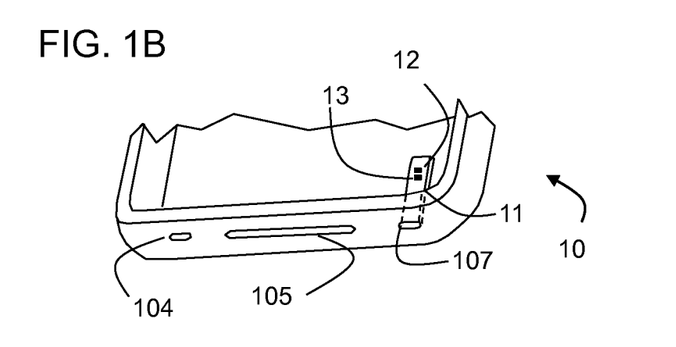
FIG. 1B is a schematic view into part of the housing of the device of FIG. 1A.

Another opening 107 is located at the lower side wall. As shown in FIG. 1B the opening 107 is linked to a tubular duct 11 passing through the interior of the housing. A temperature sensor 12 and a humidity sensor 13 are both mounted along the duct 11 such that the sensitive areas of both sensors are exposed to the ambient air through the opening 107. Suitable sensors are commercially available for example from Sensirion™ AG under the tradenames SHTC1 or STS21 (as temperature only sensor). The actual size and shape of the duct 11 depends on the volume available and the nature of the temperature sensor 12 and the humidity sensor 13 can vary, but given the physical constraints of portable mobile devices the area of the opening is typically in the range of less than 10 square millimeters and in the present example actually about less than 3.1 square millimeters.

The temperature sensor can also be in a duct separate from the humidity sensor or flush with the housing of the phone or without connection to the exterior.

Figure 2:
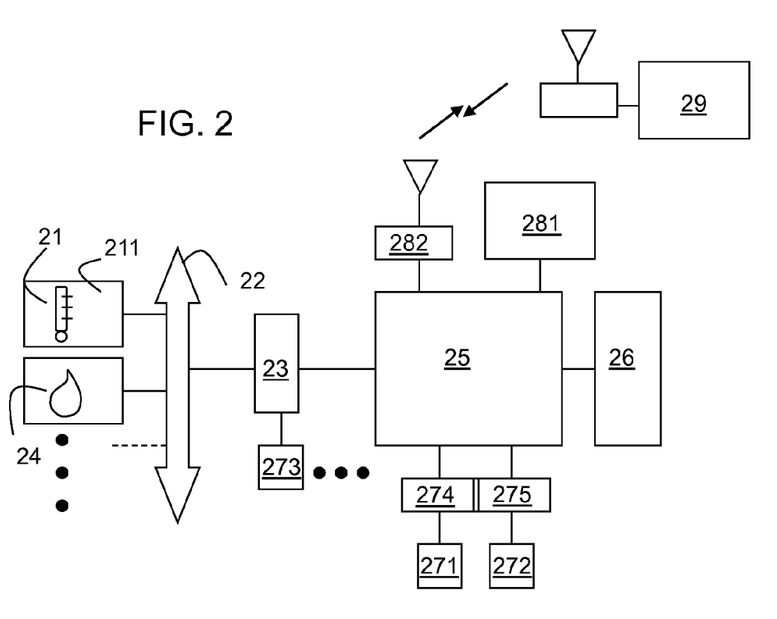
FIG. 2 is a block diagram with components of a portable electronic device.

FIG. 2 shows a block diagram with the most important components of the portable device. In particular, the device includes a temperature sensor 21 integrated as part of a CMOS substrate 211 which has CMOS circuitry to control the basic functions and the basic readout of the sensor. The CMOS circuit can include for example the driver to switch the sensor and his heater on or off as well as A/D converters and amplifiers and an I2C bus controller to exchange data on an I2C bus 22. The I2C bus connects the sensors with a sensor hub 23. A further humidity sensor 24 is also linked to the I2C bus 22. The sensor hub 23 provides a control and processing unit for more complex control and read-out functions of the temperature sensor 21 based on signals sent to or extracted from, respectively, the on-chip CMOS circuitry. The sensor hub 23 also controls other auxiliary sensors such as GPS, magnetometers, accelerometers and the like.

Further control and read-out function can also be performed by the central processing unit (CPU) 25 of the portable device, which in turn has read/write access to a memory 26, which can include static or volatile memory or both as known in the art. The memory 26 typically stores the operating system of the device and can also be used to store application programs specific to the operation of the sensors of the portable device. The functions performed by the sensor hub and the sensor specific programs and program libraries as stored and executed by the CPU 25 form a temperature processing unit capable of transforming the measurements of the sensor into a result which can be displayed or otherwise communicated to the user of the portable device.

The components and executable code required to perform a dynamic compensation as described for example in the above cited '208 application can reside in the memory 26 and be executed by the CPU 25.

The memory 26 and be executed by the CPU 25 can also be used to store and run executable code for a heat compensator applied to the sensor signals to correct the temperature as directly measured to compensate for effects of the surrounding of the sensor inside the portable device or external to it.

Such a compensator includes typically a representation of a model which takes into account heat sources, heat capacities and heat conduction of elements inside the device, its housing and other factors. Based on this model and measurements relating to present status of the elements, the measured temperature value is corrected before being displayed.

In the present example the CPU 25 and the memory 26 further include and execute a system to determine whether a change in temperature is influenced by a change in the environment or handling of the mobile device. Functions of such a system are described in more detail below while making reference to FIGS. 3 to 5 below.

In addition to the specific sensors as described above, the CPU is also connected to one or more sensors, for example the camera 271 or the microphone 272 also shown as the camera 106 and the microphone 104 of FIG. 1. Other sensors 273 such as location, acceleration and orientation sensors can be controlled by the sensor hub 23 as shown in the example. The sensors 271, 272 communicate with the CPU using their own interface units 274, 275, respectively, which operate typically in complete independence of the temperature sensor 21.

The device includes further well known input/output units 281 such as a touch sensitive display, virtual or physical keyboards and gesture tracking devices etc. The portable device as shown has a telecommunication circuit 282 comprising an antenna, driver circuits and encoding and decoding units as are well known in the art. Using such a telecommunication circuit, the device can connect to a public voice and date network and remote locations 29 as shown.

Figure 3:
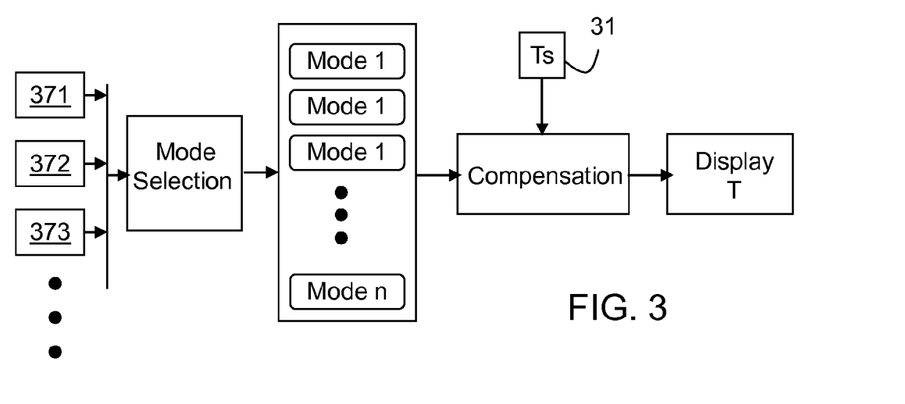
FIG. 3 is a block diagram illustrating an example of the invention.
Figure 4A:
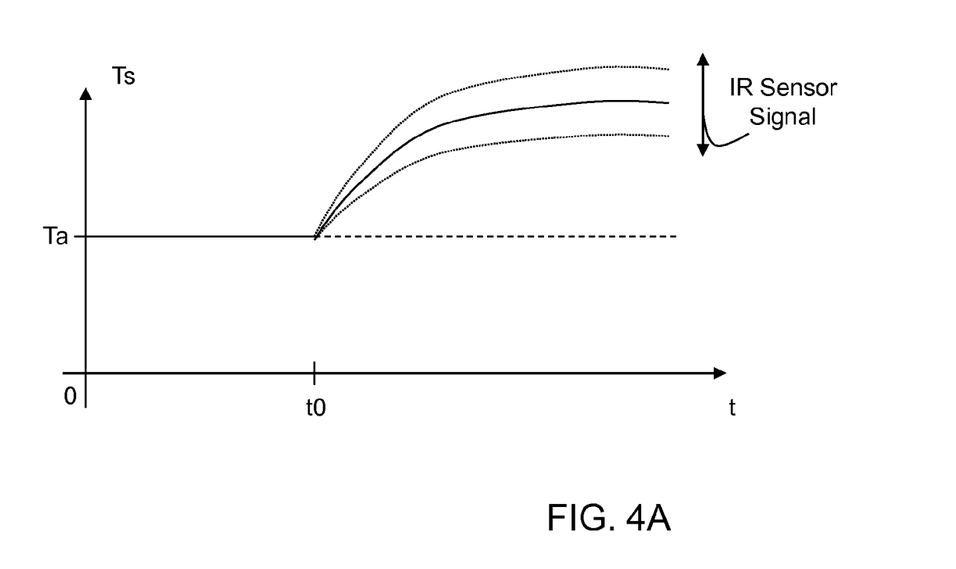
FIGS. 4A and 4B illustrate the effects of environmental changes on temperature measurements.
Figure 4B:
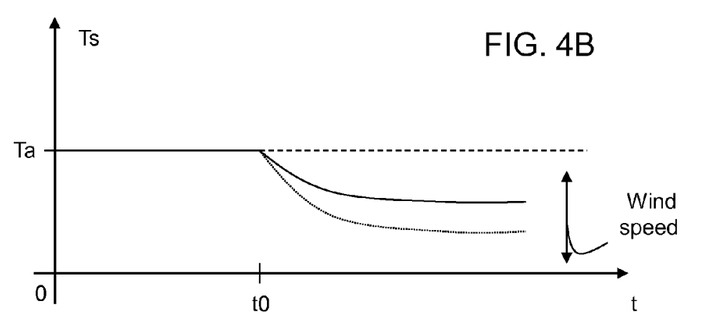
Figure 5:
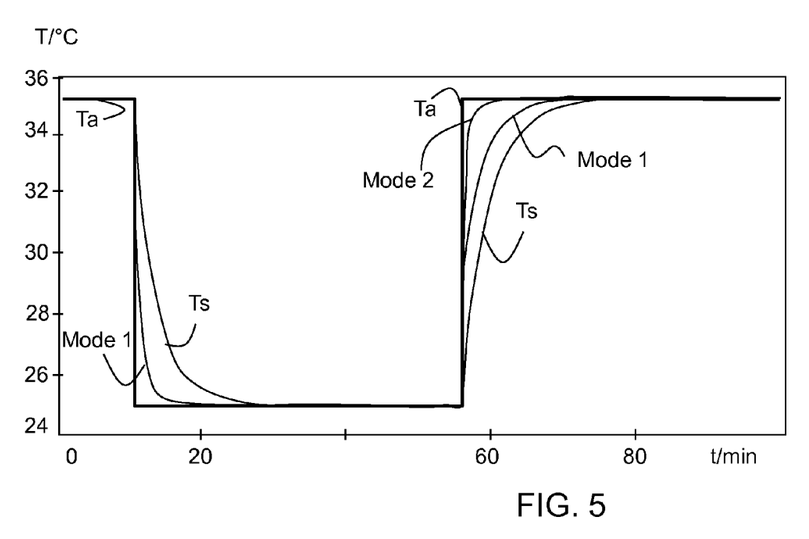
FIG. 5 is an example illustrating the switch between two compensation modes depending on wind conditions.

The diagrams of FIGS. 3, 4 and 5 illustrate elements of the system used to enhance the dynamic or heat compensation by measurement of additional environmental parameters. Whilst realized in form of executable code in the present example, the functional elements of the system can be implemented in other known forms of software, firmware or hardware. It should further be noted that some or all of the elements and their respective implementation can be also realized as dedicated microprocessor programmed accordingly.

The block diagram of FIG. 3 shows several sensors as already referred to in FIG. 2. These sensors can for example be the touch sensitive screen, one or more microphones, a brightness or IR sensor, etc. In addition the temperature sensor 31 itself can provide at least a supporting measurement used with other measurements when attempting to interpret the changes in the environment.

In the following three examples are described in more detail of possible measurements and their interpretation for the purpose of changing the compensation applied to the measurement of the integrated temperature sensor 31. These examples are however meant to be only representative of many other measurements of environmental conditions or changes potentially altering the temperature reading of the sensor 31. It should be further noted that the examples are treated separately from each other for the sake of clarity though it is understood that each described example can and in all likelihood will occur in combination with the others or with changes not described in detail herein.

Starting with the example of the mobile device exposed to intense sun light, the housing and particularly its glassy screen is found to act often very similar to a greenhouse. This effect increases the temperature in the vicinity of the temperature sensor depending on mainly the intensity of incident radiation. A measure for the sun light falling for example onto screen of the device can be measured with a light sensor 371, for example an IR sensor, a photo diode, ambient light or RGB sensor, as are standard in many modern mobile devices. These sensors are commonly used to automatically adjust the brightness or the screen or to detect hand gestures.

The precise impact of sun light on the temperature sensor is dependent on many factors including for example the design of the device and materials used building it, the optical properties of the screen and others. In spite of these complexities however it is possible to either experimentally determine the effects or simulating them using a heat capacity and heat flow model of the device. Such experiments and simulations can in addition yield a correlation between the light sensor reading and for example the amount of the sun light falling onto the screen if required.

In FIG. 4A there are shown schematic representations of the effect exposure to sun light can have on an integrated temperature sensor. The temperature Ts is shown as solid line. Neglecting the influence of internal heat sources on the integrated sensor, the temperature is shown to be equal to the ambient temperature Ta. At a time t0 the display of the device is exposed to the sun. As a result the internal temperature of the device rises and Ts starts to deviate from the ambient temperature. The rise in temperature tapers off and reaches a plateau in a steady state when heat by the sun is balances by heat losses to the environment.

The rise and the temperature Ts at the plateau can be correlated with values as measured by the IR sensor. In FIG. 4A two more temperature curves are shown as dotted lines illustrating the case of a higher intensity of sun radiation on the display and hence a higher reading of the IR sensor and of a lower intensity of sun radiation on the display and hence a lower reading of the IR sensor, respectively.

It some cases the IR sensor measurements may not be sufficient to distinguish without ambiguity between sun radiation and other radiation sources such as lamps. Measurements from other integrated and/or external sensors such as GPS to distinguish between an outdoor or indoor location of the phone, time measurement to estimate the sun position etc. can be used for that purpose.

Another example of a change in temperature as measured by an integrated temperature sensor is shown in FIG. 4B. This example illustrates a cooling due to wind chill as the device becomes exposed to a strong wind. The wind speed and hence a chill factor can be correlated for example with background noise as measured by one or more microphones integrated into the device. As with the example of FIG. 4A, the device in shown in FIG. 4B to be exposed to the wind at a time t0 after a period in which it was in equilibrium with the ambient temperature (without wind chill). The solid line shows a drop in the sensor temperature Ts as caused by the wind. The shape of the drop and the plateau at which the device reaches a new thermal equilibrium is dependent on the strength of the wind chill and can be hence correlated for example with microphone noise or other measurements.

A change in temperature can also be caused by a change in the way the device is handled by a user. As in the examples described above it can be regarded as very difficult to provide a very accurate estimate or model for the temperature changes induced by the handling. But in all the discussed examples some of the distortion in the temperature measurement may already be removed by using simplifying assumptions. In the case of handling the phone, a distinction in the heat intake through the handling may already be noticeable when holding the device in a vertical or in a horizontal position, i.e., in one or with both hands. Such a position change can be determined by the orientation sensors built for example into modern mobile phones.

A better model of hand coverage of the device and hence of the assumed heat transfer into and from the device can be gained for example by using known methods used for grip sensing such as described for example in: "GripSense: Using Built In Sensors to Detect Hand Posture and Pressure on Commodity Mobile Phones" by M. Goel et al. UIST'12 Oct. 7-10, 2012, Cambridge, Mass., USA, 542-554. These methods make use of the touchscreen and other capacitive or pressure sensors.

Once the temperature change due to an change in the environmental parameters and/or handling is modeled or established experimentally, a representation of it can be stored for example in form of a look-up table in the portable device. In FIG. 3 these representations are shown as modes 1 . . . n. During operation of the temperature sensor 31 a mode is selected based on the value(s) as measured by any one or a combination of the other integrated sensors 371, 372, 373 etc. Using again an example of a single cause, a specific value as measured by the IR sensor 371 can be used to select a model representing a certain temperature rise as illustrated in FIG. 4A.

As illustrated in FIG. 3, the selected mode is applied to generate a corrected temperature Ta using the output Ts of the integrated temperature sensor 31 as input. The exact method in which the compensation is applied can vary from an offset type correction to a more complex compensation of the dynamic response of the temperature sensor.

In an example of an offset correction the steady-state plateau value as represented by the flat end of one of the curves shown in FIG. 4 is subtracted, or added as the case maybe, from the value Ts as measured by the temperature sensor. In a variant the temperature measurement can be corrected by subtracting or adding to the actual measurement at any given time after the change in the environment the corresponding value of the model (as represented by one of the curves in FIG. 4).

The selected mode can also alter the values of compensators already applied for other corrections of the temperature measurement in the device.

For example components integrated into a portable electronic device typically generate a heat flow, which depending on their load. In the presence of such heat flows the device and its parts such as the temperature sensor achieve what is generally referred to as steady state condition or dynamic equilibrium resulting in a measured temperature Ts which is not equal the ambient temperature Ta.

The heat flows and the deviation from the ambient temperature Ta at the integrated temperature sensor can be measured using thermal sensors and or load sensors within the portable device. Using an input and a heat transfer model which models the heat flows and heat conductivities within the device and through its housing using for example coupling constants to characterize the heat flow between source and the integrated temperature sensor, between the integrated temperature sensor and the environment, and between the heat source and the environment, the heat compensation system can generate a correction of the steady state temperature Ts of the integrated temperature sensor so as to display a more correct approximation of the ambient temperature Ta.

The heat compensation system can be implemented for example by a dynamic thermal model which can be mathematically described by a differential equation system. The model may in one embodiment comprise one or more, and preferably the most relevant heat sources, and in another embodiment additionally one or more, and preferably the most relevant thermal conductivities, and in another embodiment additionally one or more, and preferably the most relevant heat capacities, as well as it comprises the temperature sensor, and it may comprise one or more optional temperature sensors that may be available in the mobile device.

The ambient temperature Ta may then be estimated from these inputs by using the following equations [1] as compensator:

$$x(k+1)=Ax(k)+Bu(k)$$

$$y(k)=Cx(k)+Du(k) \qquad [1]$$

with u(k) denoting the inputs Ts at time step k, y(k) denoting the output Ta, and x(k) denoting an internal state vector of the compensator. A is an n-by-n matrix, B an n-by-m matrix, C an 1-by-n matrix and D an 1-by-m matrix, where n is the number of states that depends on the complexity of the model and m the number of inputs. Typical inputs may be, for example, an intensity of a display, a time derivative of a battery charge level, a central processing unit load, or other power management information. Additional temperature sensors at hot spots of the portable electronic device may improve the compensation results.

Hence, in one embodiment, the portable electronic device is modelled as a thermal system with heat sources, and optionally with heat capacities and/or thermal conductivities. From this model, a time-discrete heat compensator according to the state space description of equations [1] is derived, that can easily be implemented on a microprocessor of the portable electronic device by using the following software code:

```
      while not stopped
   {
      u=Read_Input( );      // Read input
      y=C*x+D*u;            // Calculate output
      x=A*x+B*u;            // State Update
      Ta = y;               // Ambient Temperature = y
   }
```

The compensated temperature Ta may be displayed on the display 21, however, in the present invention the compensator as represented with the equations [1] has several modes. The modes are represented by different values of the internal state vector x(k) of the compensator and/or of the matrices A, B, C and D.

The modes are selected depending on a change in the environment of the device as indicted by the other sensors.

Similarly the environmental changes can be used to select one of a plurality of different dynamic compensations. Dynamic compensation systems as such are described for example in the cited '208 application, leading to system equations [2] identical in their mathematical structure to equation [1] above:

$$x(k+1)=Ax(k)+Bu(k)$$

$$y(k)=Cx(k)+Du(k) \qquad [2]$$

where the orders of the matrices A, B, C and D represent the order of the compensation filter and the nature of the matrix coefficient depend on the underlying model of the sensor response with their values being chosen to reflect closest the modelled system.

The exact values for a compensator built on a system of equations such as equations [2] is a matter of the model chosen and its complexity. After choosing a suitable model, the values can be determined by experiment placing for example a device in a defined temperature environment and implementing step changes of the temperature.

Using the above example of two different wind speeds as shown in FIG. 4B a suitable dynamic compensation can be selected as represented in two or more sets of values for the matrix elements of A, B, C, and D, i.e.:

$$x(k+1)=A1x(k)+B1u(k)$$

$$y(k)=C1x(k)+D1u(k)$$

$$x(k+1)=A2x(k)+B2u(k)$$

$$y(k)=C2x(k)+D2u(k) \qquad [3]$$

A continuous time simulation of such a dynamic compensator is shown in FIG. 5 based on $$dx/dt=-\tfrac{1}{3}x+\tfrac{1}{3}u,$$

$$y=x$$

$$dx/dt=-1/4.2x+1/4.2u,$$

$$y=x \qquad [2.2]$$

with the corresponding Laplace-transformed compensator being $$y(s)/u(s)=(3s+1)/(s+1)$$

$$y(s)/u(s)=(4.2s+1)/(s+1) \qquad [2.3]$$

where the second of each set of equations [2.1], [2.2], [2.3] represents a faster dynamic compensation mode 2 applied at a lower wind speed than the mode 1. This selection is based on the observation that the faster mode 2 is more sensitive to changes in the wind speed and hence can result in larger errors in the temperature value Ta as estimated by the model.

In a more general case the mode selection and the mode representation can become very complex. For instance, it is possible to use multiple sensor inputs a variety of different sensors 371, 372, 373 etc. and process these inputs to derive a selection criterium which allows to select one of the specific modes 1, . . . , n of compensation. Such a process involving multiple variables can be performed using standard routines and basic functions such as baseline corrections, polynomial fits, max-min determination, derivative or integral calculations, spectral analysis such as FFT or DFT, filtering, matrix calculations etc. The routines can further include more complex variants of statistical analysis tools such as Principal Component Analysis, Linear Discriminant Analysis and the like or neural network based tools such as Self-organizing Maps, Back Propagation, pattern recognition routines etc.

As the exact nature of the routines is not seen as a specific aspect of the present example, it suffices to refer to known libraries of such routines as available for example in MATLAB®. As a result of such an analysis the multitude of different environments in which a mobile device can be or the many different ways a mobile device is handled can be registered through a plurality of internal and external sensors and other information and a most likely mode of compensation chosen.

Similarly if multiple environmental influences on the temperature measurement are simultaneously present the compounded impact of such influences need to be considered leading to more complex modes of correction than the modes described in the examples above. For example it can be assumed that the response to sun light incidence and wind add linearly and hence a correction mode to compensate for the presence of both would be a representation of the linear combination of the solid curves as shown in FIGS. 4A and 4B, respectively.

Alternatively, it is possible to model the impact of two or more simultaneous changes in the environment or handling of the device using a mathematical model of the device and its components. It is also possible to perform experiments involving two or more simultaneous changes in the environment or handling to measure the corresponding changes in the temperature as measured by the integrated sensor. Typically some basic modes will be determined accurately while other while be derived from the basic modes through interpolation and/or combination.

In another example the mobile device is assumed to be stored in a pocket close to the body of the user. In this case a temperature measurement of the ambient temperature is distorted due to the presence of body heat as shown in the upper curve 61 of FIG. 6. A model to compensate for such a change can be gained by performing several measurements at different ambient temperatures with the sensor inside and outside a pocket. To facilitate the model it can be assumed that the heat transfer coefficient through the fabric is the same for the interface with the body and with the environment.

At activation of the pocket mode (at time t0) the compensator reduces the temperature for duration of the pocket mode, i.e. to time t1, in line with the model. After the pocket mode ends, the compensation is reduced again in line with the device response as modeled. The compensation signal is shown as curve 62 in FIG. 6.

Figure 6:
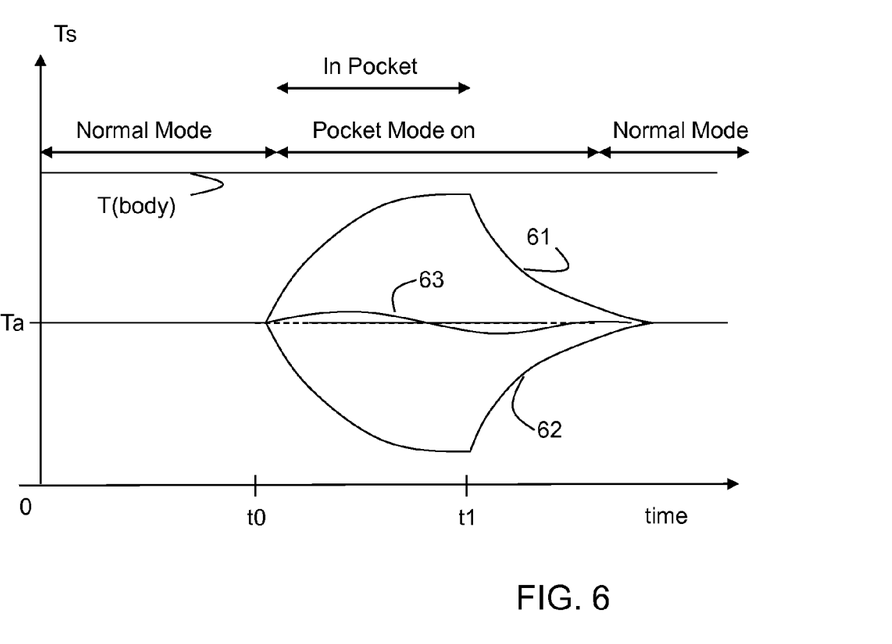
FIG. 6 is an example illustrating a compensation mode used to compensate for the distortions caused by storing the device in a user's pocket.

As a result of this compensation the compensated temperature curve 63 remains closer to the real ambient temperature Ta and an accurate reading of the ambient temperature is possible in a shorter time than if using the normal compensation mode.

The pocket mode can be selected by the mode selector based for example on the reading of a proximity sensor (capacitive or IR based), a the light or brightness sensor and by a test whether the display is switched off.

While there are shown and described presently preferred embodiments of the invention, it is to be understood that the invention is not limited thereto but may be otherwise variously embodied and practised within the scope of the following claims.

The invention claimed is:

1. A portable electronic device comprising an integrated temperature sensor for measuring an ambient temperature, a compensator for reducing a difference between an output of the temperature sensor and the ambient temperature, wherein the compensator switches depending on environmental and/or handling conditions between a plurality of compensation modes selected dependent on measurements of one or more integrated and/or external sensors, wherein the compensator is a heat compensator compensating for internal heat flows to and from the temperature sensor and/or a dynamic compensator compensating for the response function of the temperature sensor, wherein, for the heat compensator, the ambient temperature is estimated by using the following equations [1] as heat compensator:

$$x(k+1)=Ax(k)+Bu(k)$$

$$y(k)=Cx(k)+Du(k) \quad [1]$$

with u(k) denoting inputs at time step k including the output of the temperature sensor as input of the heat compensator, y(k) denoting the estimated ambient temperature as output of the heat compensator, and x(k) denoting an internal state vector of the heat compensator, with the plurality of compensation modes realized by using different values of the internal state vector x(k) and/or by using different values of matrices A, B, C and D, and wherein, for the dynamic compensator, the following equations [2] are used:

$$x(k+1)=Ax(k)+Bu(k)$$

$$y(k)=Cx(k)+Du(k) \quad [2]$$

with u(k) denoting inputs at time step k including the output of the temperature sensor as input of the heat compensator, y(k) denoting the estimated ambient temperature as output of the heat compensator, and x(k) denoting an internal state vector of the heat compensator, with the plurality of compensation modes realized by using different values of the internal state vector x(k) and/or by using different values of the matrices A, B, C and D.

2. The device according to claim 1, wherein the environmental and/or handling conditions comprise a change of the device location in and out of a user's pocket.

3. The device according to claim 1, wherein compensation modes are based on different compensation filters and/or different sensor response functions.

4. The device according to claim 1, wherein the environmental and/or handling conditions comprise sunlight incidence, wind, and grip modes.

5. The device according to claim 1, wherein the other integrated and/or external sensors comprise light sensors, resistive, capacitive, pressure, microphones, position, acceleration, and orientation sensors, or time and location.

6. The device according to claim 1, being selected from a group comprising a mobile phone,
a handheld computer,
an electronic reader,
a tablet computer,
a game controller,
a pointing device,
a photo or a video camera,
a digital music player,
a wrist watch,
a key fob,
a head set,
a picture frame and
a computer peripheral.

7. A method for compensating a temperature sensor integrated into a portable electronic device comprising the steps of measuring an ambient temperature using an integrated temperature sensor, and compensating the temperature measurement by switching depending on environmental and/or handling conditions between a plurality of compensation modes and using measurements of one or more other integrated and/or external sensors to select a compensation mode, employing a compensator for reducing a difference between an output of the temperature sensor and the ambient temperature, wherein the compensator switches depending on the environmental and/or handling conditions between the plurality of compensation modes selected dependent on the measurements of the one or more integrated and/or external sensors, wherein the compensator is a heat compensator compensating for internal heat flows to and from the temperature sensor and/or a dynamic compensator compensating for the response function of the temperature sensor, wherein, for the heat compensator, the ambient temperature is estimated by using the following equations [1] as heat compensator:

$$x(k+1)=Ax(k)+Bu(k)$$

$$y(k)=Cx(k)+Du(k) \quad [1]$$

with u(k) denoting inputs at time step k including the output of the temperature sensor as input of the heat compensator, y(k) denoting the estimated ambient temperature as output of the heat compensator, and x(k) denoting an internal state vector of the heat compensator, with the plurality of compensation modes realized by using different values of the internal state vector x(k) and/or by using different values of matrices A, B, C and D, and wherein, for the dynamic compensator, the following collations [2] are used:

$$x(k+1)=Ax(k)+Bu(k)$$

$$y(k)=Cx(k)+Du(k) \quad [2]$$

with u(k) denoting inputs at time step k including the output of the temperature sensor as input of the heat compensator, y(k) denoting the estimated ambient temperature as output of the heat compensator, and x(k) denoting an internal state vector of the heat compensator, with the plurality of compensation modes realized by using different values of the internal state vector x(k) and/or by using different values of the matrices A, B, C and D.

8. The method of claim 7, wherein the compensation modes include a mode for compensating the measurement during a period where the device is stored in a user's pocket.

\* \* \* \* \*